(12) United States Patent
Rusert (10) Patent No.: US 10,491,913 B2
(45) Date of Patent: Nov. 26, 2019

(54) IDENTIFYING A PARAMETER SET FOR DECODING A MULTI-LAYER VIDEO REPRESENTATION

(71) Applicant: Telefonaktiebolaget L M Ericsson (publ), Stockholm (SE)

(72) Inventor: Thomas Rusert, Kista (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 425 days.

(21) Appl. No.: 14/395,614

(22) PCT Filed: Apr. 24, 2013

(86) PCT No.: PCT/SE2013/050440
§ 371 (c)(1),
(2) Date: Oct. 20, 2014

(87) PCT Pub. No.: WO2013/162454
PCT Pub. Date: Oct. 31, 2013

(65) Prior Publication Data
US 2015/0078455 A1   Mar. 19, 2015

Related U.S. Application Data

(60) Provisional application No. 61/637,371, filed on Apr. 24, 2012.

(51) Int. Cl.
*H04N 19/44* (2014.01)
*H04N 19/29* (2014.01)
*H04N 19/39* (2014.01)

(52) U.S. Cl.
CPC ............. *H04N 19/44* (2014.11); *H04N 19/29* (2014.11); *H04N 19/39* (2014.11)

(58) Field of Classification Search
CPC ........ H04N 19/70; H04N 19/30; H04N 19/44; H04N 19/46; H04N 19/187; H04N 19/597;
(Continued)

(56) References Cited

U.S. PATENT DOCUMENTS 7,643,560 B2 * 1/2010 Hong .................. H04N 21/242
375/240.25
8,325,821 B1 * 12/2012 Kizhepat ........ H04N 21/234345
375/240.26
(Continued)

OTHER PUBLICATIONS

International Search Report for International Application No. PCT/SE2013/050440 dated Jul. 23, 2013, 3 pages.
(Continued)

*Primary Examiner* — Dave Czekaj
*Assistant Examiner* — Kehinde Abimbola
(74) *Attorney, Agent, or Firm* — Sage Patent Group (57) ABSTRACT

A method of identifying a parameter set for decoding a multi-layer video representation. The method includes identifying the parameter set based on a parameter set identifier and one or more layer identifiers indicating a layer of the video representation. Optionally, the method may further include returning the identified parameter set from a parameter set database, and activating the parameter set. Identifying parameter sets using both a parameter set identifier and one or more layer identifiers is advantageous in that the length of the parameter set identifier codeword may be shorter. This results in bitrate savings, since the number of bits which need to be transmitted is reduced. Corresponding computer program products and video decoders for decoding a multi-layer video representation are disclosed.

17 Claims, 4 Drawing Sheets

(58) Field of Classification Search
CPC .... H04N 19/31; H04N 19/463; H04N 19/188; H04N 19/105; H04N 19/172; H04N 19/184; H04N 19/176; H04N 19/33; H04N 19/61; H04N 19/124; H04N 19/52; H04N 19/136; H04N 19/186; H04N 19/593; H04N 19/159; H04N 19/182
See application file for complete search history.

(56) References Cited

U.S. PATENT DOCUMENTS

| | | | | |
|---|---|---|---|---|
| 8,457,155 | B2* | 6/2013 | Hannuksela | H04N 19/597 370/468 |
| 8,649,441 | B2* | 2/2014 | Hong | H04N 19/70 375/240.25 |
| 8,767,840 | B2* | 7/2014 | Chuang | G06F 11/10 375/240.27 |
| 9,137,547 | B2* | 9/2015 | Van der Auwera | H04N 19/70 |
| 9,143,802 | B2* | 9/2015 | Chen | H04N 19/70 |
| 9,204,156 | B2* | 12/2015 | Lu | H04N 19/40 |
| 9,591,318 | B2* | 3/2017 | Lu | H04N 19/39 |
| 9,609,317 | B1* | 3/2017 | Kizhepat | H04N 19/00472 |
| 9,615,079 | B2* | 4/2017 | Takahashi | G06T 15/205 |
| 9,712,802 | B2* | 7/2017 | Takahashi | G06T 15/205 |
| 9,769,485 | B2* | 9/2017 | Lu | H04N 19/39 |
| 2005/0143085 | A1* | 6/2005 | Bi | H04W 72/005 455/452.2 |
| 2006/0251169 | A1* | 11/2006 | Wang | H04N 19/105 375/240.12 |
| 2007/0223595 | A1* | 9/2007 | Hannuksela | H04N 19/70 375/240.26 |
| 2008/0101470 | A1* | 5/2008 | Hong | H04N 21/242 375/240.14 |
| 2010/0067581 | A1* | 3/2010 | Hong | H04N 19/105 375/240.16 |
| 2010/0205498 | A1* | 8/2010 | Chuang | G06F 11/10 714/747 |
| 2011/0044550 | A1* | 2/2011 | Tian | H04N 19/597 382/238 |
| 2011/0063409 | A1* | 3/2011 | Hannuksela | H04N 19/597 348/42 |
| 2011/0142138 | A1* | 6/2011 | Tian | H04N 19/597 375/240.24 |
| 2012/0044322 | A1* | 2/2012 | Tian | H04N 19/597 348/43 |
| 2012/0183077 | A1* | 7/2012 | Hong | H04N 19/70 375/240.25 |
| 2012/0269276 | A1* | 10/2012 | Hong | H04N 19/70 375/240.25 |
| 2013/0064284 | A1* | 3/2013 | Samuelsson | H04N 19/70 375/240.01 |
| 2013/0070859 | A1* | 3/2013 | Lu | H04N 19/39 375/240.25 |
| 2013/0107942 | A1* | 5/2013 | Chen | H04N 19/70 375/240.03 |
| 2013/0114742 | A1* | 5/2013 | Hannuksela | H04N 19/46 375/240.25 |
| 2013/0156101 | A1* | 6/2013 | Lu | H04N 19/30 375/240.12 |
| 2013/0177071 | A1* | 7/2013 | Lu | H04N 19/30 375/240.03 |
| 2013/0188733 | A1* | 7/2013 | Van der Auwera | H04N 19/70 375/240.24 |
| 2013/0194384 | A1* | 8/2013 | Hannuksela | H04N 19/597 348/43 |
| 2013/0235152 | A1* | 9/2013 | Hannuksela | H04N 19/597 348/43 |
| 2013/0272372 | A1* | 10/2013 | Hannuksela | H04N 19/70 375/240.01 |
| 2013/0279564 | A1* | 10/2013 | Wang | H04N 19/70 375/240.02 |
| 2013/0279599 | A1* | 10/2013 | Wang | H04N 19/70 375/240.25 |
| 2013/0342647 | A1* | 12/2013 | Takahashi | G06T 15/205 348/43 |
| 2014/0002592 | A1* | 1/2014 | Takahashi | H04N 19/597 348/42 |
| 2014/0009574 | A1* | 1/2014 | Hannuksela | H04N 19/597 348/42 |
| 2014/0064363 | A1* | 3/2014 | Samuelsson | H04N 19/50 375/240.12 |
| 2014/0369404 | A1* | 12/2014 | Van der Auwera | H04N 19/70 375/240.02 |
| 2015/0063463 | A1* | 3/2015 | Choi | H04N 19/70 375/240.25 |
| 2017/0048550 | A1* | 2/2017 | Hannuksela | H04N 19/597 |
| 2017/0064283 | A1* | 3/2017 | Takahashi | G06T 15/205 |
| 2017/0134737 | A1* | 5/2017 | Lu | H04N 19/30 |
| 2018/0035131 | A1* | 2/2018 | Samuelsson | H04N 19/70 |

OTHER PUBLICATIONS

Written Opinion of the International Searching Authority for International Application No. PCT/SE2013/050440 dated Jul. 23, 2013, 7 pages.

Boyce et al.: "SEI message for sub-bitstream profile & level indicators", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-I0231, Apr. 16, 2012; 7 pages.

Rusert: "High-level syntax for 3D and scalable extensions: Inter-layer SPS prediction", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-I0535, Apr. 26, 2012; 6 pages.

Communication pursuant to Article 94(3) EPC for European Patent Application No. 13723270.8 dated Aug. 30, 2017, 8 pages.

Boyce et al.: "High level syntax hooks for future extensions", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-H0388, Jan. 21, 2012; 8 pages.

Sjöberg et al.: "High-Level Syntax for Bitstream Extraction", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G607, Nov. 8, 2011; 14 pages.

* cited by examiner

IDENTIFYING A PARAMETER SET FOR DECODING A MULTI-LAYER VIDEO REPRESENTATION

CROSS REFERENCE TO RELATED APPLICATION

This application is a 35 U.S.C. § 371 national stage application of PCT International Application No. PCT/SE2013/050440, filed on 24 Apr. 2013, which itself claims the benefit of U.S. provisional Patent Application No. 61/637,371, filed 24 Apr. 2012, the disclosures and contents of both of which are incorporated by reference herein in their entirety. The above-referenced PCT International Application was published in the English language as International Publication No. WO 2013/162454 A1 on 31 Oct. 2013.

TECHNICAL FIELD

The invention relates to a method of identifying a valid parameter set for decoding a multi-layer video representation, a corresponding computer program and a corresponding computer program product, and video decoders for decoding a multi-layer video representation.

BACKGROUND

High Efficiency Video Coding (HEVC) is a next generation video coding standard which is currently under development and standardization. HEVC aims at substantially improving coding efficiency compared to the state-of-the-art (H.264/AVC, aka MPEG-4 AVC), especially for high-resolution video content. The initial focus of the HEVC development is on mono video, i.e., one camera view only. However, given the relevance of multi-resolution and multi-view 3D representations, extensions towards scalable coding and multi-view video or depth map coding are planned or ongoing. Those extensions require multi-layer support.

An HEVC bitstream without extensions can be considered as a single-layer bitstream, i.e., a bitstream representing the video in a single representation, e.g., as a single video view having a single resolution and single quality. In multi-layer extensions, an HEVC single-layer bitstream is typically included as a "base layer". For instance, in multi-view 3D extensions, additional layers may represent additional video views, captured from different camera positions, depth information, or other information. Further, in scalability extensions, additional layers may represent the video in higher video picture resolutions, higher pixel fidelity, other colorspaces, or alike, providing improved video quality relative to the base layer.

HEVC uses a video packetization concept based on Network Abstraction Layer (NAL) units. A compressed video bitstream consists of a sequence of NAL units. Each NAL unit can carry coded video data, so-called Video Coding Layer (VCL) data, also referred to as "coded slice", parameter data needed for video decoding, so-called Parameter Sets (PSs), or supplementary data, so-called Supplementary Enhancement Information (SEI). Each NAL unit consists of a NAL unit header and a NAL unit payload. The NAL unit header consists of a set of identifiers which can be used by networks to manage the compressed bit streams. For example, in order to reduce the transmission bitrate of a video in case of limited network bandwidth, some NAL units may be discarded, based on information carried in the NAL unit headers, so as to minimize the quality degradation caused by discarding. This process is denoted as "bitstream thinning".

In multi-layer HEVC extensions, each NAL unit will have a NAL unit header that includes elements that indicate which layer of the multiple layers the NAL unit is associated with. Such identifiers identify, e.g., a temporal layer (temporal_id), a spatial layer (dependency_id), a fidelity layer (quality_id), or a more generic layer (layer_id, or layer_id_plus1).

HEVC parameter sets (PSs) contain parameters needed in the decoding process. Examples for parameters needed in the decoding process include the decoder profile, i.e., the mode of operation specifying the supported decoding algorithms, the decoder level, specifying implementation limits such as maximum supported picture size, frame rate, and bit rate, the video picture dimensions (video picture width and height), and parameters related to configuration of algorithms and settings necessary for decoding the compressed bitstream. Several different types of parameter sets exist, in particular Sequence Parameter Sets (SPSs), Picture Parameter Sets (PPSs), and Adaptation Parameter Sets (APSs). Introduction of further parameter set types, such as the Video Parameter Set (VPS) and the Group Parameter Set (GPS), is under discussion.

The SPS contains parameters that change very infrequently, and which therefore are valid for a complete video sequence. The PPS contains parameters that may change more frequently than SPS parameters, but typically do not change very frequently. The APS contains information that typically changes frequently, e.g., with every coded picture. In the envisioned scalable/3D extensions to HEVC, it is likely that these PS concepts will be re-used, and PSs will be present in different layers. In that context, the proposed VPS is envisioned to contain information that applies identically for several or all layers of a multi-layer bitstream, and which changes infrequently. Parameter sets typically have an identifier, "PS ID" by which they can be referred to.

In the HEVC decoding process, PSs are "activated" when they are referred to by NAL units that contain coded slices, i.e., coded video data. When a PS is active, the values of the syntax elements, i.e., parameters, in the PS can be accessed by the decoder and used in the decoding process.

In the current draft HEVC specification, each parameter set is identified by a parameter set identifier, also referred to as parameter set reference. For instance, each SPS is associated with an identifier seq_parameter_set_id, each PPS is associated with an identifier pic_parameter_set_id, and each APS is identified by an identifier aps_id. Likewise, each VPS may be identified by an identifier vps_id, and each GPS may be identified by an identifier gps_id. The identifiers are typically coded using Variables Length Codes (VLC), such as "Exp-Golomb" codes, which represent integer values 0, 1, 2, 3, . . . , where coding of lower values requires fewer bits.

In the current draft HEVC specification, the following mechanisms for activating parameter sets exist:

A PPS is referenced by reference to its pic_parameter_set_id in the slice header, i.e., by a field in a coded slice, and the referenced PPS is activated when the coded slice is decoded. Zero or one PPS can be active at each time.

SPSs are referenced by reference to their respective seq_parameter_set_id by PPSs. When a PPS is activated, then the referenced SPS is activated, too. Zero or one SPS can be active at a time.

APSs are referenced by reference to their respective aps_id in the slice header, similar as PPS, and activated when the slice is decoded.

A VPS (not in the current HEVC draft, but under discussion) may be referenced by reference to its vps_id by SPSs and is activated when a referencing SPS is activated.

Alternatively, a GPS is under discussion which, if introduced, would replace the activation processes for APS, PPS, and SPS. A GPS would be activated by reference to its gps_id in the slice header when the slice is decoded. The GPS would include references to a PPS, SPS, zero, one or several APS, and potentially a VPS. When the GPS is activated, other PSs referenced in the GPS would be activated, too.

In the draft HEVC single-layer specification, parameter sets are identified by their respective parameter set identifier (PS ID). In some cases, this may not be efficient in a multi-layer HEVC extension since coding of parameter set identifiers may require too many bits.

Another problem associated with the prior art is related to the activation chain for activation of SPSs. An SPS is activated when referenced by a PPS which is activated by being referenced by a slice header (SH) which is being decoded. This particular activation chain may be illustrated as SH→PPS→SPS. In a multi-layer HEVC video representation, different layers typically require specific SPSs, i.e., some of the SPSs cannot be re-used across several layers. Due to the activation chain SH→PPS→SPS, the presence of a dedicated SPS for a certain layer requires presence of a separate PPS, since the SPS is referenced by the PPS. Adding additional PPSs for that purpose causes bitrate overhead, i.e., increases the amount of bits to be transmitted.

SUMMARY

It is an object of the invention to provide an improved alternative to the above techniques and prior art.

More specifically, it is an object of the invention to provide an improved identification of parameter sets for decoding a multi-layer video representation. The parameter set may be an SPS, a PPS, a GPS, an APS, a VPS, or any other parameter set comprising parameters which are utilized for decoding a compressed video bitstream.

These and other objects of the invention are achieved by means of different aspects of the invention, as defined by the independent claims. Embodiments of the invention are characterized by the dependent claims.

According to a first aspect of the invention, a method of identifying a valid parameter set for decoding a multi-layer video representation is provided. The method comprises identifying the parameter set. The parameter set is identified based on a parameter set identifier and one or more layer identifiers. Each layer identifier indicates a layer of the video representation.

According to a second aspect of the invention, a computer program is provided. The computer program comprises computer program code. The computer program code is adapted, if executed on a processor, to implement an embodiment of the method according to first aspect of the invention.

According to a third aspect of the invention, a computer program product is provided. The computer program product comprises a computer readable storage medium. The computer readable storage medium has the computer program according to the second aspect of the invention embodied therein.

According to a fourth aspect of the invention, a video decoder for decoding a multi-layer video representation is provided. The video decoder comprises an input section, a processor, a memory, and an output section. The processor is arranged for identifying a valid parameter set for decoding the multi-layer video representation. The parameter set is identified based on a parameter set identifier and one or more layer identifiers. Each of the layer identifiers indicates a layer of the video representation.

According to a fifth aspect of the invention, another video decoder for decoding a multi-layer video representation is provided. The video decoder comprises a parameter set database, a parameter set collector, and a parameter set identificator. The parameter set collector is arranged for acquiring NAL units and analyzing the NAL units. The parameter set collector is further arranged for storing the parameter set NAL unit in the parameter set database if a parameter set NAL unit is detected. The parameter set identificator is arranged for acquiring a parameter set identifier and one or more layer identifiers, looking up the parameter sets in the parameter set database, and returning a parameter set. The returned parameter set has a parameter set identifier according to the acquired parameter set identifier and one or more layer identifiers according to the acquired layer identifiers.

The invention makes use of an understanding that valid parameter sets may be identified through a combination of one or more layer identifiers and a parameter set identifier, instead of identifying parameter sets only through their parameter set identifier. In this respect, a valid parameter set is understood to be a parameter set which may be used in, or is required for, the decoding process. The layer identifiers which are additionally used for identifying a parameter set are one or several of the layer identifiers carried in the NAL unit header of the associated parameter set NAL unit.

Identifying parameter sets using both a parameter set identifier and a layer identifier, instead of using only the parameter set identifier, is advantageous in that the length of the parameter set identifier codeword may be shorter, since only parameter sets in a given layer need to be addressed. This is because the number of parameter sets in a given layer may be lower than the number of parameter sets for all layers, and the average codeword length, when VLC is used, may be lower if fewer codewords are used. This results in bitrate savings, as the number of bits which need to be transmitted is reduced.

According to an embodiment of the invention, the parameter set is valid for a range of values of the one or more layer identifiers. That is, the parameter set is valid for more than one layer of the video representation. This is advantageous since flexibility is added to the video coding, which may result in bit cost savings. For instance, it may be beneficial that a certain parameter set is valid only for one layer, thus reducing the average codeword length for the parameter set identifier. However, such validity for one layer may prevent re-using the parameter set across different layers. In such cases, the parameter set may be valid for a subset, or all, of the layers.

According to an embodiment of the invention, the range of values is indicated in a NAL unit header of the parameter set. This is advantageous in that information relating to the validity of the parameter set with respect to layer identifiers is carried in the parameter set, and is therefore directly available to the parameter set database. To this end, a parameter set which is valid for a certain range of values of the one or more layer identifiers is returned from the parameter set database only if the one or more layer identifiers are within the range of values.

According to an embodiment of the invention, the parameter set is a PPS, the parameter set identifier is a PPS identifier obtained from a slice header of a coded slice of the video representation, and the one or more layer identifiers are obtained from a NAL unit header of the coded slice.

According to an embodiment of the invention, the parameter set is an SPS, the parameter set identifier is an SPS identifier obtained from a PPS, and the one or more layer identifiers are obtained from a NAL unit header of a coded slice of the video representation.

According to an embodiment of the invention, the PPS comprises a list of SPS identifiers. Each SPS identifier indicates an SPS for a given layer identifier.

According to an embodiment of the invention, the parameter set is an SPS, the parameter set identifier is an SPS identifier obtained from a PPS, and the one or more layer identifiers are obtained from a NAL unit header of the PPS.

According to an embodiment of the invention, the method further comprises returning the identified parameter set from a parameter set database.

According to an embodiment of the invention, the method further comprises activating the parameter set, e.g., an SPS. More specifically, an SPS is activated based on its seq_parameter_set_id signaled in a PPS and a layer_id comprised in the NAL unit header of the coded slice that triggers the activation. This is advantageous in that the PPS can be re-used across several layers. In other words, the PPS, which refers to an SPS with seq_parameter_set_id=SPSID, can be referenced by a coded slice in layer X, thus activating the SPS with seq_parameter_set_id=SPSID and layer_id=X. The same PPS can be referenced by a coded slice in layer Y, thereby activating the SPS with seq_parameter_set_id=SPSID and layer_id=Y. To this end, if specific SPSs are required for specific layers, use of separate PPSs is not required, and the number of PPSs, and thus the number of bits to be transmitted, may be reduced.

According to an embodiment of the invention, the parameter set identificator is further arranged for acquiring a parameter set type and returning the parameter set which is of the requested type.

Even though advantages of the present invention have in some cases been described with reference to embodiments of the method according to the first aspect of the present invention, corresponding reasoning applies to embodiments of the second, third, fourth, and fifth, aspect of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

In order to elucidate the invention, a way of avoiding additional PPSs which are related to the chained activation discussed hereinbefore, i.e., SH→PPS→SPS, is described in the following. Such additional PPSs, which increase the transmission bitrate, may be avoided by breaking the activation chain.

One way of breaking the activation chain is to activate both PPS and SPS directly from the slice header, i.e., SH→PPS and SH→SPS. In this way, slice headers in different layers can refer to the same PPS, while at the same time referring to different SPSs. The disadvantage with that solution is that both SPS identifier and PPS identifier need to be signaled in the slice header, which may increase the bitrate. Another disadvantage is that introducing such mechanism into an HEVC multi-layer extension would be inconsistent with the HEVC single-layer design, and may break the compatibility with HEVC single-layer implementations which expect the chained activation. Optionally, an indicator, e.g., signaled in the PPS, may be used for indicating whether the SH→PPS→SPS activation is used or the alternative activation, i.e., SH→PPS and SH→SPS, is used.

An alternative way of breaking the activation chain is to introduce a GPS, utilizing an activation SH→GPS in connection with GPS→PPS, GPS→SPS, and GPS→APS. The disadvantage of this approach is that new activation chains SH→GPS→PPS, SH→GPS→SPS, and SH→GPS→APS, are introduced. As a consequence, specific GPSs are required for each SPS which is specific for a certain layer, leading to an increase in bitrate.

Yet another alternative way of avoiding additional PPSs due to the chained activation SH→PPS→SPS is to re-use a PPS and activate different SPSs based on one or more layer identifiers, which may, e.g., be signaled in the slice header. For instance, the PPS could include a list or a table of SPS identifiers, the entries in the list identifying different SPSs for different given layer identifier(s). In other words, when a PPS is activated, given a certain layer identifier or several layer identifiers, an SPS identifier associated with the given layer identifier(s) is determined based on the list or table comprised in the PPS, and the respective SPS is activated. The presence of such list or table may be conditional on a flag or indicator which may, e.g., be carried in the PPS. A disadvantage with is approach is a potential additional bit cost, since multiple SPS identifiers need to be signaled in list or table in the PPS.

In the following, a way of identifying parameter sets based on a combination of a parameter set identifier and one or more layer identifier(s), in accordance with embodiments of the invention, is described.

Figure 1:
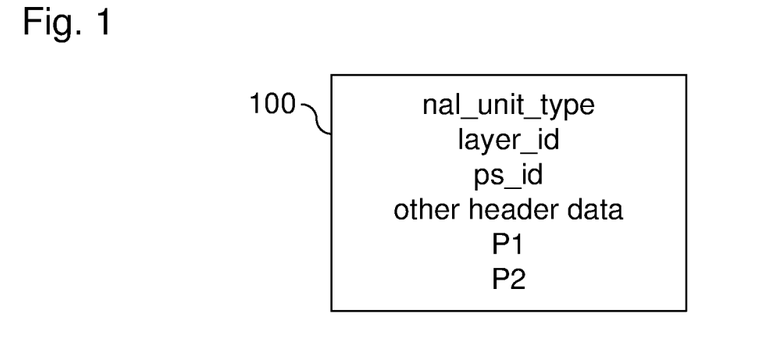
FIG. 1 shows a parameter set NAL unit, in accordance with an embodiment of the invention.

In FIG. 1, a parameter set NAL unit 100 is shown. NAL unit 100 comprises several parameters, also known as syntax elements or information elements, such as a nal_unit_type indicator which identifies the NAL unit 100 as a parameter set NAL unit and, more specifically, identifies the type of the parameter set, i.e., whether the parameter set comprised in NAL unit 100 is an SPS, PPS, APS, GPS, or VPS. NAL unit 100 further comprises one or several layer identifiers layer_id, a parameter set identifier ps_id, other header data, as well as other parameters, in FIG. 1 denoted P1 and P2.

Figure 2:
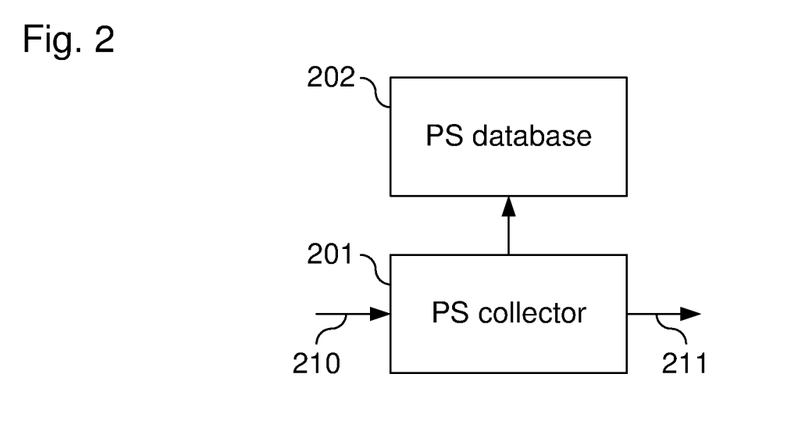
FIG. 2 shows a parameter set collector, in accordance with an embodiment of the invention.

In FIG. 2 a parameter set collector is illustrated, which may be part of a video decoder, such as video decoders 900 and 1000, described with reference to FIGS. 9 and 10, respectively. A series of NAL units 210 is provided to the parameter set collector 201. Typically, the NAL units are carried in a coded bitstream. Parameter set collector 201 analyses the NAL units 210 and, if a parameter set NAL unit is detected, i.e., a NAL unit having a nal_unit_type which corresponds to a parameter set NAL unit type, that NAL unit is stored in an associated parameter set database 202 for later use. Subsequently, the NAL units, in particular the non-parameter set NAL units, are forwarded 211 for further processing, e.g., video decoding, as is known in the art, or to a parameter set identificator, as is described in the following.

Figure 3:
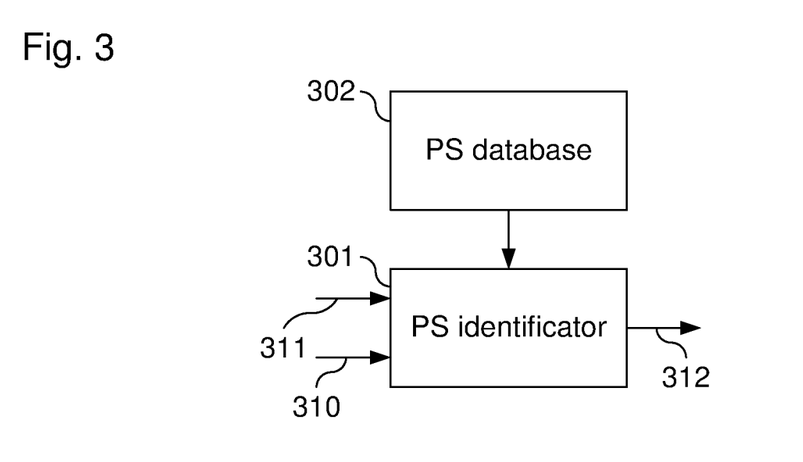
FIG. 3 shows a parameter set identificator, in accordance with an embodiment of the invention.
Figure 9:
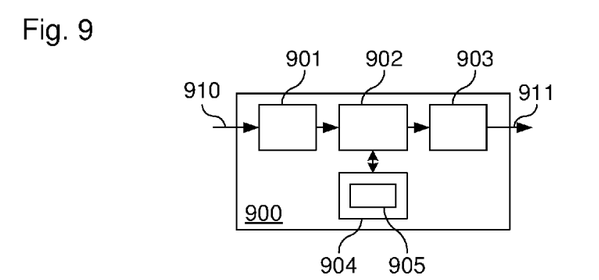
FIG. 9 shows a video decoder, in accordance with an embodiment of the invention.
Figure 10:
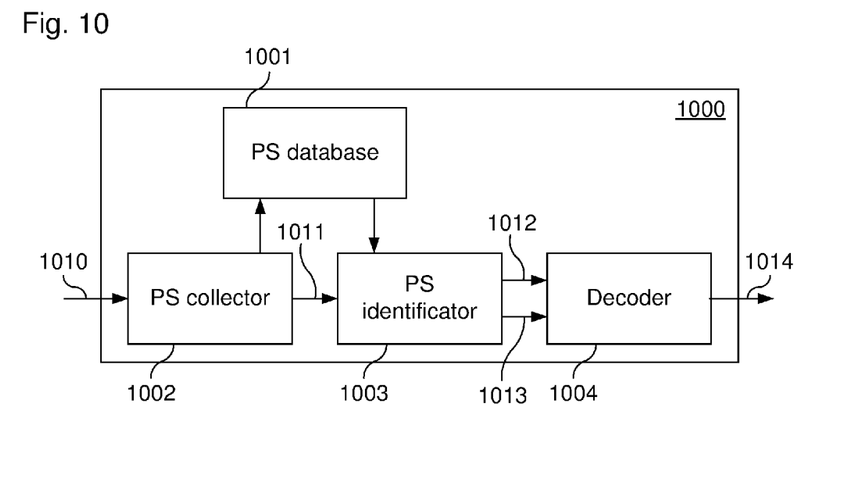
FIG. 10 shows a video decoder, in accordance with another embodiment of the invention.

In FIG. 3, a parameter set identificator 301 is illustrated, which may be part of a video decoder, such as video decoders 900 and 1000, describe with reference to FIGS. 9 and 10, respectively. A parameter set identifier ps_id 310 and one or several layer identifier(s) layer_id 311 are provided to the parameter set identificator 301. The parameter set identifier 310 and the one or several layer identifiers 311 may be extracted from NAL units carried in the coded bitstream. Optionally, a type of the requested parameter set may also be provided. The parameter set identificator 301 looks up the parameter sets stored in the associated parameter set database 302, which may be identical to parameter set database 202 of FIG. 2, and returns the parameter set 312 which has a parameter set identifier matching the provided ps_id 310 and the provided layer identifier(s) layer_id 311. In other words, a parameter set which is required for decoding of one or more coded slices is identified based on a parameter set identifier and one or more layer identifiers. Subsequently, the identified parameter set 312 may be activated and used in the decoding process. Optionally, the parameter set identificator 301 may identify parameter sets solely based on a parameter set identifier 310, without using layer identifier(s) 311, as is described further below in relation to validity indicators.

In the following, improved mechanisms of activating parameter sets are described.

Figure 4:
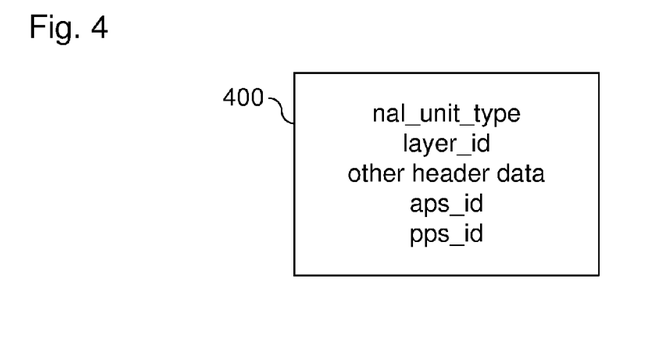
FIG. 4 shows a coded slice NAL unit, in accordance with an embodiment of the invention.

In FIG. 4, a coded slice NAL unit 400 is illustrated. NAL unit 400 comprises a nal_unit_type identifier, identifying it as coded slice, one or more layer identifiers layer_id, and other header data. In addition, NAL unit 400 comprises parameter set identifiers, namely an APS identifier aps_id and a PPS identifier pps_id. When the coded slice 400 is decoded, the associated APS and PPS may be obtained from the parameter set database, such as parameter set database 302 described with reference to FIG. 3, and subsequently activated. Alternatively, when a GPS is involved, the GPS may be activated from the coded slice, and APS and PPS may be activated based on the corresponding references in the GPS, as was described above.

Figure 5:
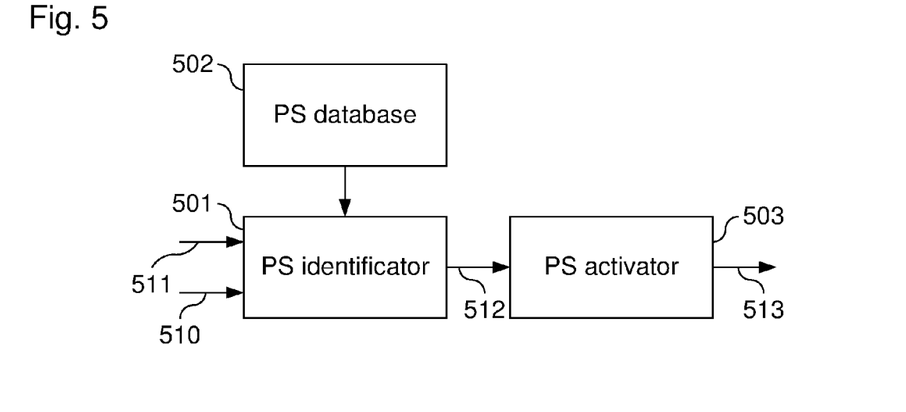
FIG. 5 illustrates parameter set activation, in accordance with an embodiment of the invention.

In FIG. 5, activation of a parameter set based on a parameter set identifier in combination with one or more layer identifier(s) is illustrated, in accordance with embodiments of the invention. To this end, parameter set identificator 501 is provided with one or more layer_id 510, obtained from the NAL unit header of a coded slice, and the parameter set identifier 511, e.g., aps_id, pps_id, or seq_parameter_set_id, obtained from the slice header of the coded slice. The provided identifiers are used for retrieving the corresponding parameter set from parameter set database 502, as was described with reference to FIG. 3. The parameter set obtained from parameter set database 502 is forwarded 512 to parameter set activator 503, where it is activated, i.e., made available 513 for subsequent decoding of coded slices.

Figure 6:
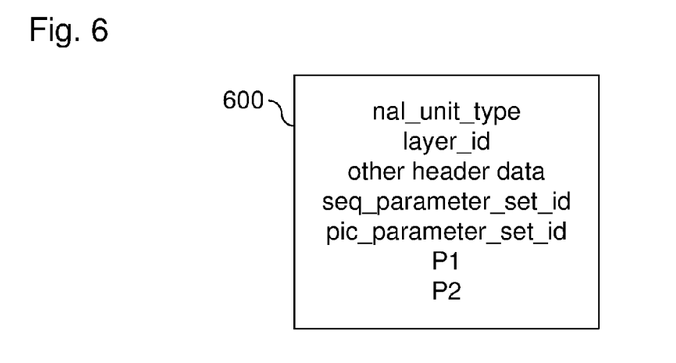
FIG. 6 shows a PPS NAL unit, in accordance with an embodiment of the invention.

In the following, by way of example, activation of a PPS and subsequent activation of an SPS is described with reference to FIGS. 6 and 7. For this purpose, a PPS NAL unit 600 is illustrated in FIG. 6. PPS NAL unit 600 comprises a nal_unit_type identifier, identifying it as PPS NAL unit, one or more layer identifier(s) layer_id, and other header data. PPS NAL unit 600 further comprises an SPS identifier seq_parameter_set_id and a PPS identifier pic_parameter_set_id.

Figure 7:
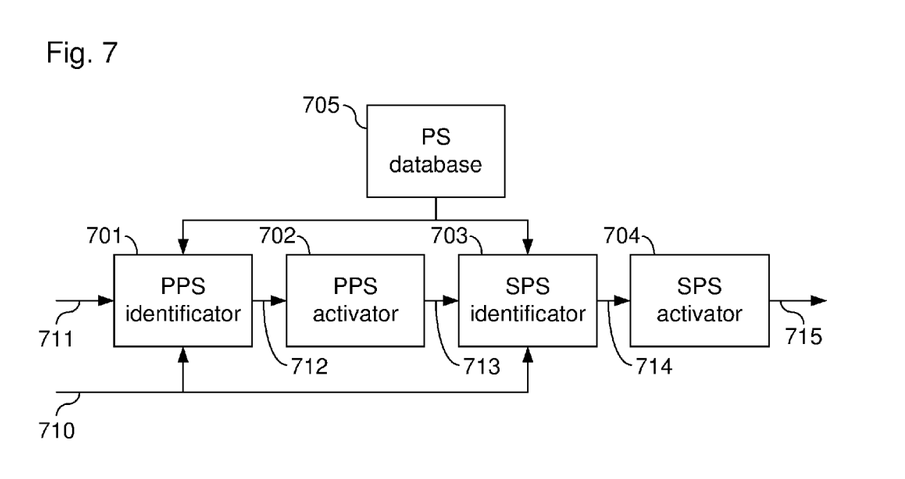
FIG. 7 illustrates activation of a PPS and subsequent activation of an SPS, in accordance with an embodiment of the invention.

In FIG. 7 the activation of the PPS, and subsequent activation of the SPS as indicated in the PPS, is illustrated. The activation of the PPS may be triggered by decoding of a coded slice. The process described here is typically part of the decoding process in a video decoder, such as video decoders 900 and 1000 described with reference to FIGS. 9 and 10. By means of PPS identificator 701, The PPS is identified and obtained from the parameter set database 705 based on a PPS identifier 711 and, optionally, one or more layer identifier(s) 710, as was described hereinbefore. The PPS identifier 711 is obtained from the slice header of the coded slice, and the layer_id 710 is obtained from the NAL unit header of the coded slice. Subsequently, the obtained PPS 712 is forwarded to, and activated by, PPS activator 702. From the activated PPS, an SPS identifier 713 is obtained, and together with the layer identifier(s) 710 from the NAL unit header of the coded slice, the SPS is identified by SPS identificator 703 and obtained from the parameter set database 705. The obtained SPS 714 is subsequently forwarded to, and activated by, SPS activator 704, i.e., the parameters comprised in the SPS are made available 715 for further processing, e.g., video decoding.

As an alternative, instead of identifying an SPS based on the SPS identifier in the PPS and the layer identifier(s) in the NAL unit header of the coded slice, the SPS may be identified by the SPS identifier in the PPS and the layer identifier(s) in the NAL unit header of the PPS.

A parameter set may be identified by its parameter set identifier and one or more layer identifier(s), as is described above. When obtaining the parameter set, e.g., from a parameter set database, based on a parameter set identifier and one or more layer identifier(s), a parameter set which has a matching layer_id may be retrieved from the parameter set database. In this case, the parameter set is valid for particular value(s) of layer_id. Optionally, a parameter set may be valid for several value(s) of layer_id, e.g., for a range of value(s) of layer_id or for all value(s) of layer_id within a multi-layer video bitstream. For instance, if a parameter set with a given value of PS ID is valid for all value(s) of layer_id, then the parameter set identificator may identify and return that parameter set from the database if a parameter set with the given value of PS ID is requested, regardless of the value of layer_id. If a parameter set with a given value of PS ID is, e.g., valid for a range of value(s) of layer_id, then the parameter set identificator would identify and return the parameter set from the database which has a matching PS ID and a layer identifier matching and one of the value(s) in the range of layer_id for which the parameter set is valid.

The validity of a parameter set for certain layers, i.e., certain values of layer_id, may be indicated by an indicator. For example, a flag in the parameter set may indicate whether the parameter set is valid for all value(s) of layer_id or only for the value(s) of layer_id indicated in the NAL unit header of the parameter set, e.g., by means of a parameter carried in the NAL unit header. The parameter set validity could also be indicated by other types of indicators. For instance, profile_idc could be used as an indicator, e.g., such that a parameter set is valid for a certain value or range of profile_idc or alike. The PPS identificator 701 may be configured to consider the parameter set validity for the parameter sets in the database when it processes a request for a parameter set.

Figure 8:
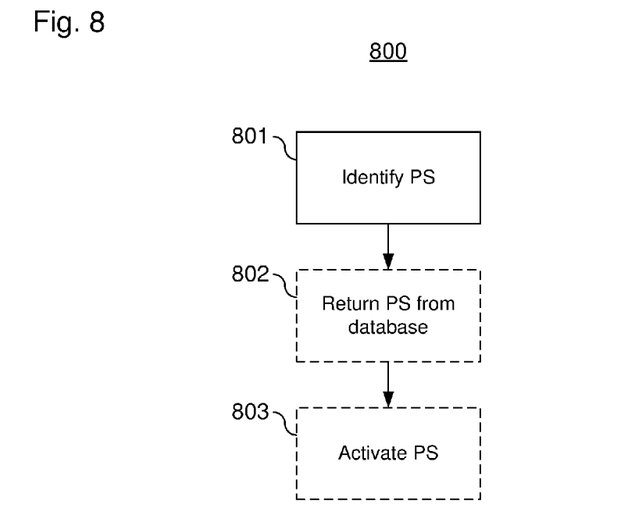
FIG. 8 shows a method identifying a parameter set for decoding a multi-layer video representation, in accordance with an embodiment of the invention.

In the following, an embodiment of the method of identifying a parameter set for decoding a multi-layer video representation is described with reference to FIG. 8.

Method 800 comprises identifying 801 the parameter set based on a parameter set identifier in combination with one or more layer identifiers which indicate a layer of the video representation. Optionally, method 800 may further comprise returning 802 the identified parameter set from the parameter set database. Further, method 800 may comprise activating 803 the parameter set.

In identifying 801 the parameter set, the parameter set may be a PPS, in which case the parameter set identifier is a PPS identifier which is obtained from a slice header of a coded slice of the video representation. The one or more layer identifiers are obtained from a NAL unit header of the coded slice.

Further with regard to identifying 801 the parameter set, the parameter set may alternatively be an SPS, in which case the parameter set identifier is an SPS identifier obtained from a PPS. The one or more layer identifiers are obtained from a NAL unit header of a coded slice of the video representation. In this case, the PPS may comprise a list of SPS identifiers, and each SPS identifier indicates an SPS for a given layer identifier. As a further alternative, the one or more layer identifiers may be obtained from a NAL unit header of the PPS.

In FIG. 9, an embodiment of a video decoder is illustrated. The decoder 900 comprises at least an input section 901, an output section 903, a processor 902, and a memory 904. The decoder 900 receives a bitstream 910 via the input section 901, and the processor 902 is configured to perform the procedures described hereinabove, in particular identifying, and optionally activating, a parameter set based on a parameter set identifier in combination with one or more layer identifiers. Optionally, the processor 902 may further be configured for decoding coded slices. The output section 903 provides the video for further processing, e.g., displaying.

The functionality of the processor 902 may be realized by a computer program 905 stored in the memory 904. The computer program 905 comprises computer program code which is adapted, when executed on the processor 902, to implement the procedures described hereinabove.

An embodiment of the computer program 905 may be provided as a computer program product comprising a computer readable storage medium, which has the computer program 905 embodied therein. The computer readable storage medium may, e.g., be memory 904, a memory stick, or any other type of data carrier. It will also be appreciated that an embodiment of the computer program 905 may be provided by means of downloading the computer program over a communication network.

In the following, an alternative embodiment of a video decoder is described with reference to FIG. 10. Video decoder 1000 comprises a parameter set database 1001, a parameter set collector 1002, a parameter set identificator 1003, and a decoder 1004. The parameter set collector 1002 is arranged for acquiring NAL units from a coded bitstream 1010 carrying a multi-layer video representation and analyzing the NAL units. If a parameter set NAL unit is detected, i.e., a NAL unit having a nal_unit_type parameter corresponding to a parameter set NAL unit type, the parameter set NAL unit is stored in the parameter set database 1001 for later use. Further, the parameter set identificator 1003 is arranged for acquiring a parameter set identifier and one or more layer identifiers from NAL units carried in the coded bitstream 1011, looking up the parameter sets in the parameter set database 1001, and returning the parameter set which has a parameter set identifier according to the acquired parameter set identifier and one or more layer identifiers according to the acquired layer identifiers. Optionally, the parameter set is returned for a range of values of the one or more layer identifiers, if the parameter set is valid for more than one layer of the multi-layer video representation. The range of values, for which the parameter set is valid, is indicated in the NAL unit header of the parameter set. The coded bitstream 1012, and the parameter set 1013 returned from the parameter set database 1001, are activated and forwarded to decoder 1004 where the parameter set 1013 is used for decoding coded slices carried in the coded bitstream 1012. Optionally, the parameter set identificator 1003 may acquire a parameter set type and return a parameter set which is of the requested type.

The person skilled in the art realizes that the invention by no means is limited to the embodiments described above. On the contrary, many modifications and variations are possible within the scope of the appended claims.

The invention claimed is:

1. A method of decoding a multi-layer video bitstream, the method comprising:
   receiving a coded video bitstream;
   obtaining a first Picture Parameter Set (PPS) identifier from a slice header of a coded slice of the coded video bitstream, wherein the first PPS identifier identifies a first PPS that is among information to be used to decode the coded video bitstream;
   obtaining a first layer identifier from a Network Abstraction Layer (NAL) unit header of the coded slice of the coded video bitstream;
   identifying a PPS of a plurality of PPSs, each having a unique PPS identifier and a layer identifier, that has a unique PPS identifier that matches the first PPS identifier from the slice header of the coded slice of the coded video bitstream and has a layer identifier that matches the first layer identifier from the NAL unit header as the first PPS; and decoding the coded video bitstream using the first PPS for decoding the current layer identified responsive to the unique PPS identifier of the first PPS matching the first PPS identifier from the slice header and the layer identifier of the first PPS matching the first layer identifier from the NAL unit header.

2. The method according to claim 1, wherein the first PPS for decoding the current layer is valid for a range of values of the first layer identifier from the NAL unit header of the coded slice.

3. The method according to claim 2, wherein the range of values is indicated in the NAL unit header of the first PPS.

4. The method according to claim 1, further comprising: activating the first PPS for decoding the current layer.

5. The method according to claim 4, further comprising:
obtaining, from the first PPS that was activated, a Sequence Parameter Set (SPS) identifier;
identifying an SPS for decoding the current layer that corresponds to the SPS identifier;
obtaining the SPS for decoding that was identified from a parameter set database; and
activating the SPS for decoding that was identified from the parameter set database.

6. The method according to claim 1, wherein the first PPS for decoding the current layer comprises a list of SPS identifiers, each SPS identifier indicating an SPS for a given first layer identifier.

7. A computer program product comprising a non-transitory computer readable storage medium storing computer program code, the computer program code being adapted, when executed on a processor, to perform operations according to the method of claim 1.

8. A video decoder for decoding a multi-layer video bitstream, the decoder comprising:
an input section configured to receive a coded video bitstream;
a processor;
a memory; and
an output section configured to provide the video for further processing;
wherein the processor is configured to perform operations comprising:
receiving a coded video bitstream;
obtaining a first Picture Parameter Set (PPS) identifier from a slice header of a coded slice of the coded video bitstream, wherein the first PPS identifier identifies a first PPS that is among information used to decode the coded video bitstream;
obtaining a first layer identifier from a Network Abstraction Layer (NAL) unit header of the coded slice of the coded video bitstream;
identifying a PPS of a plurality of PPSs, each having a unique PPS identifier and a layer identifier, that has a unique PPS identifier that matches the first PPS identifier and has a layer identifier that matches the first layer identifier as the first PPS; and
decoding the coded video bitstream using the first PPS for decoding the current layer identified responsive to the unique PPS identifier of the first PPS matching the first PPS identifier from the slice header and the layer identifier of the first PPS matching the first layer identifier from the NAL unit header.

9. The video decoder according to claim 8, wherein the first PPS for decoding the current layer is valid for a range of values of the first layer identifier from the NAL unit header of the coded slice.

10. The video decoder according to claim 9, wherein the range of values is indicated in the NAL unit header of the first PPS.

11. The video decoder according to claim 8, further comprising:
activating the first PPS for decoding the current layer.

12. The video decoder according to claim 11, further comprising:
obtaining, from the first PPS for decoding the current layer that was activated, a Sequence Parameter Set (SPS) identifier;
identifying an SPS for decoding the current layer that corresponds to the SPS identifier;
obtaining the SPS for decoding that was identified from a parameter set database; and
activating the SPS for decoding that was identified from the parameter set database.

13. The video decoder according to claim 8, wherein the first PPS for decoding the current layer comprises a list of SPS identifiers, each SPS identifier indicating an SPS for a given first layer identifier.

14. The method according to claim 4 wherein activating the first PPS for decoding the current layer comprises obtaining the first PPS for decoding the current layer from a database for subsequent decoding of the current layer of the coded slice.

15. The video decoder according to claim 11 wherein activating the first PPPS for decoding the current layer comprises obtaining the first PPS for decoding the current layer from a database for subsequent decoding of the current layer of the coded slice.

16. The method according to claim 1 wherein identifying the PPS comprises:
determining at least one PPS from the plurality of PPS s that has a unique PPS identifier that matches the first PPS identifier from the slice header;
determining whether one of the at least one PPS has a layer identifier that matches the first layer identifier from the NAL unit header; and
responsive to determining that the one of the at least one PPS has a layer identifier that matches the first layer identifier from the NAL unit, identifying the one of the one PPS as the first PPS for decoding the current layer.

17. The video decoder according to claim 8 wherein in identifying the PPS, the processor is configured to perform operations comprising:
determining at least one PPS from the plurality of PPS s that has a unique PPS identifier that matches the first PPS identifier from the slice header;
determining whether one of the at least one PPS has a layer identifier that matches the first layer identifier from the NAL unit header; and
responsive to determining that the one of the at least one PPS has a layer identifier that matches the first layer identifier from the NAL unit, identifying the one of the at least one PPS as the first PPS for decoding the current layer.

* * * * *

UNITED STATES PATENT AND TRADEMARK OFFICE
CERTIFICATE OF CORRECTION

PATENT NO. : 10,491,913 B2
APPLICATION NO. : 14/395614
DATED : November 26, 2019
INVENTOR(S) : Thomas Rusert Page 1 of 1

It is certified that error appears in the above-identified patent and that said Letters Patent is hereby corrected as shown below:

In the Claims

In Column 12, Line 33, in Claim 15, delete "PPPS" and insert -- PPS --, therefor.

In Column 12, Line 39, in Claim 16, delete "PPS s" and insert -- PPSs --, therefor.

In Column 12, Line 52, in Claim 17, delete "PPS s" and insert -- PPSs --, therefor.

Signed and Sealed this
Twelfth Day of May, 2020

Andrei Iancu
*Director of the United States Patent and Trademark Office*